Aug. 5, 1941.  W. J. WHITE  2,251,583
MANURE LOADER
Filed April 22, 1940   3 Sheets-Sheet 1
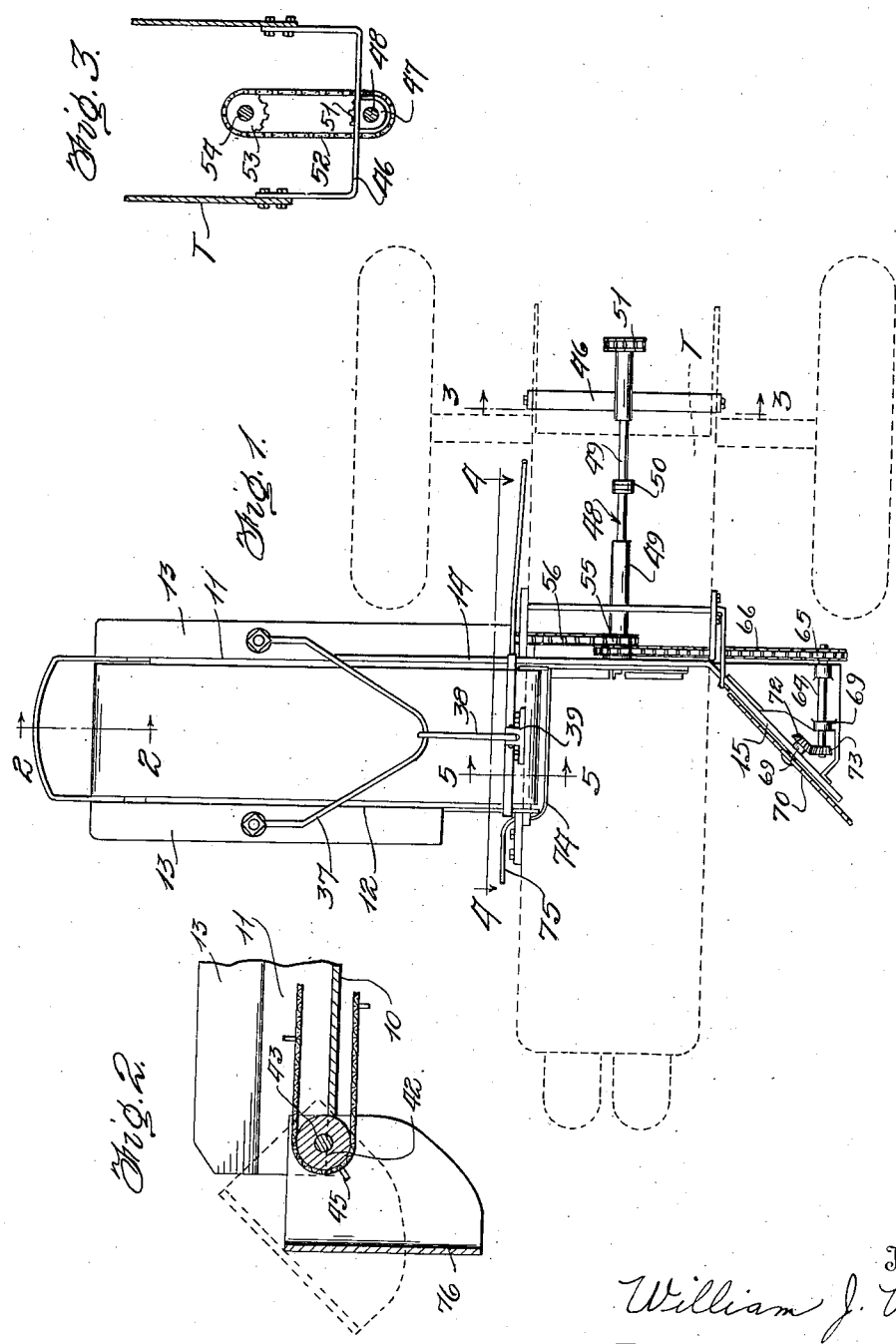
Inventor,
William J. White,
By Frank S. Appleman,
Attorney Aug. 5, 1941.  W. J. WHITE  2,251,583
MANURE LOADER
Filed April 22, 1940  3 Sheets-Sheet 2

Inventor,
William J. White,
By Frank S. Appleman,
Attorney.

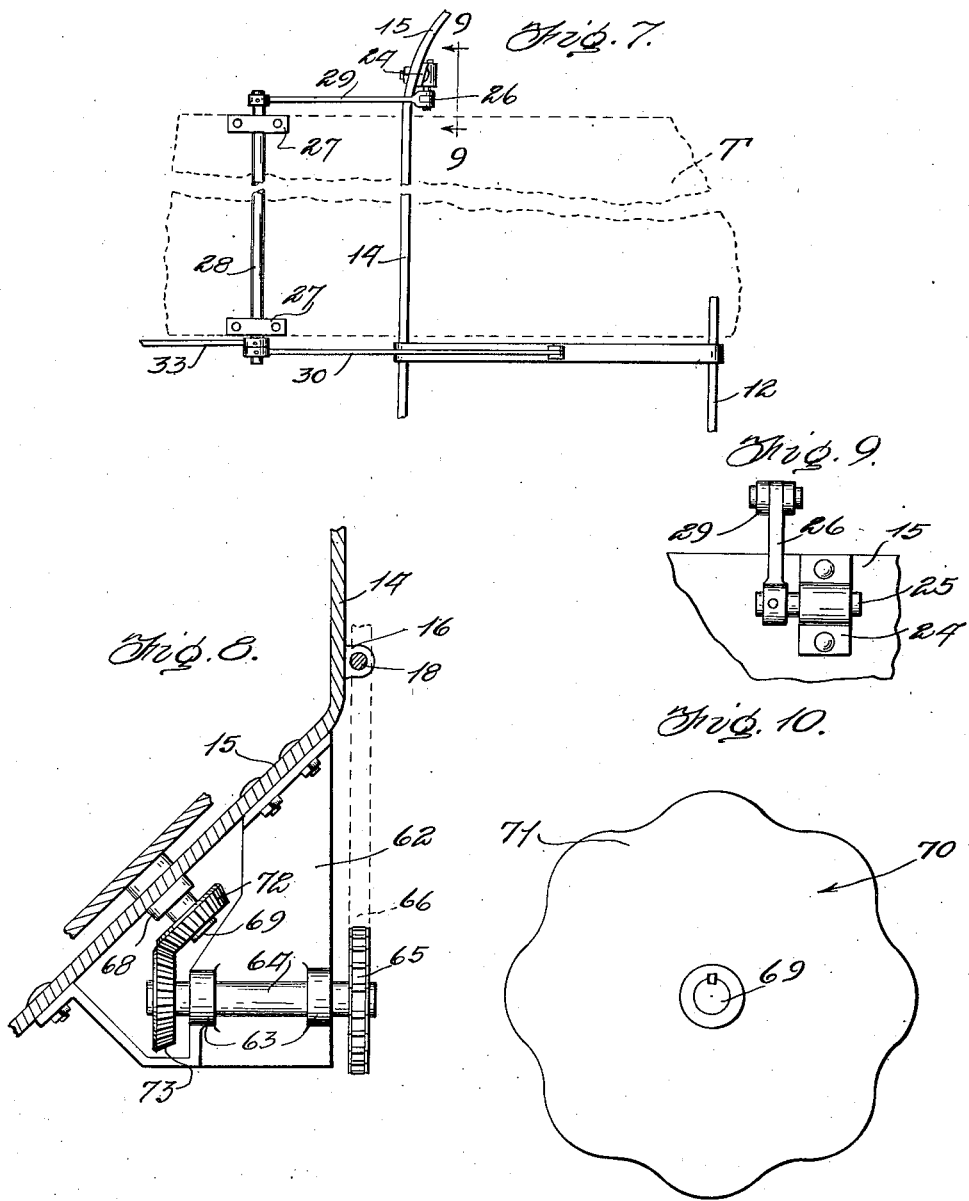

Patented Aug. 5, 1941

2,251,583

UNITED STATES PATENT OFFICE 2,251,583

MANURE LOADER

William J. White, Ocheyedan Township, Osceola County, Iowa, assignor of one-fourth to Louis L. Corcoran, Sibley, Iowa Application April 22, 1940, Serial No. 331,049

4 Claims. (Cl. 37—190)

This invention relates to loading machines, and has special reference to a manure loader.

One important object of the invention is to provide a novel device of this character which may be attached beneath an ordinary farm tractor and operated from the mechanism of such tractor.

A second important object of the invention is to provide a device of this character wherein the attachment to the tractor is such that the device may be raised or lowered, as desired.

A third important object of the invention is to provide a novel arrangement of parts in a device of this kind, whereby manure may be chopped up into small portions for the purpose of more readily loading and conveying the same.

A fourth important object of the invention is to provide a novel arrangement of means for pitching chopped manure onto a conveyor.

A fifth important object of the invention is to provide means at the ends of the conveyor forming a part of this invention such that the material will be delivered on top of the conveyor and may be deflected downwardly at the delivery end of such conveyor.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which:

Figure 1 illustrates a plan view of the device with a tractor shown in dotted outline in reference thereto;

Figure 2 illustrates an enlarged detail section on the line 2—2 of Fig. 1;

Figure 3 illustrates a detail section on the line 3—3 of Fig. 1;

Figure 7 illustrates a fragmentary plan view of the means for raising and lowering the device with reference to the tractor;

Figure 8 illustrates a fragmentary plan view of the driving means for the chopping wheel used herein;

Figure 9 illustrates an enlarged fragmentary view on the line 9—9 of Fig. 7; and Figure 10 illustrates a face view of the chopping wheel used in this device.

Figure 4:
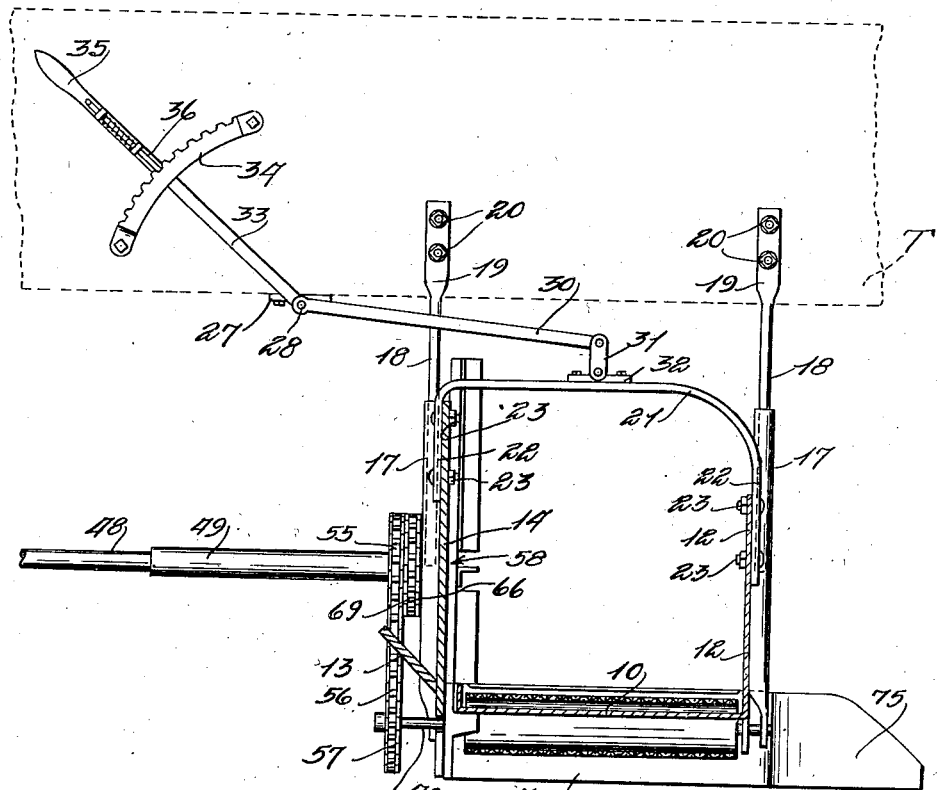
Figure 4 illustrates an enlarged fragmentary section on the line 4—4 of Fig. 1.
Figure 5:
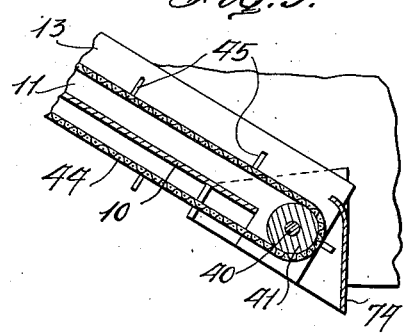
Figure 5 illustrates a fragmentary section on the line 5—5 of Fig. 1.
Figure 6:
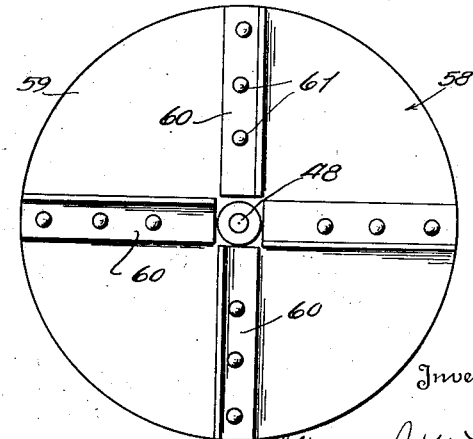
Figure 6 illustrates a face view of a pitching wheel used in this invention.

In the embodiment of the invention as shown in the present drawings, there is provided a conveyor frame having a bottom 10, a rear side wall 11 projecting upwardly from the bottom, and a correspondingly arranged front side wall 12. These side walls have outwardly flaring upper portions 13. Attached to the wall 11 is a frame plate having a portion 14 which extends along the wall 11 and projects beyond the material receiving end thereof. The plate 14 is also provided with a portion 15 which extends from the outer end of the portion 14 at an angle thereto so that the portion 15 is inclined forwardly from the portion 14. When in use, the portion 14 extends underneath the body of the tractor T and the portion 15 extends from the left side of the tractor. Adjacent the angle between the portions 14 and 15, the portion 14 carries a vertical sleeve 16, and on each of the walls 11 and 12 adjacent the tractor side there is provided a vertical sleeve 17. Rods 18 project up from the sleeves 16 and 17, these sleeves being slidable on the rods, and the rods have flattened upper ends 19 which are secured to the tractor by means of bolts 20. With this arrangement, the device is vertically movable with respect to the tractor body.

In order to provide for vertically adjusting the device, a yoke 21 has depending arms 22 which are secured to the front wall 12 and the plate portion 14 by bolts 23, as seen in Fig. 4. On the plate portion 15 is mounted a bearing lug 24 wherein is carried a pin 25 having on one end a forwardly extending link 26. Bearings 27 are provided for bolting beneath the body of the tractor T and in these bearings is journalled a rock shaft 28 on one end of which is fixed a rock lever 29 having the link 26 pivoted thereto. At the other end of the shaft 28 is a rock lever 30 which has its forward end pivoted to the upper end of a link 31 and the lower end of the link 31 is connected to a bracket 32 fixed on the yoke 21. The shaft 28 also has fixed thereon one end of an operating lever 33 which works beneath a quadrant 34 fixed on the side of the tractor T, and the lever 33 has an operating handle 35 and a latch 36 for engaging in an appropriate notch of the quadrant 34. By manipulating the operating lever, it will be seen from Fig. 4 that the entire movable portion of the loader may be raised and lowered. Suitable bracing 37 may be used to connect the conveyor sides to a link 38 pivoted to a bracket 39 on the side of the tractor T. This bracing will prevent rocking of the conveyor.

At the inner end of the conveyor is a shaft 40 whereon is fixed a roller 41 and a similar roller 42 is carried by a shaft 43 at the outer end of the conveyor. Around the rollers 42 and 41 is trained a conveyor belt 44 having flights 45. Fixed to the sides of the tractor is a supporting yoke 46 carrying a bearing 47 wherein is journalled a shaft 48 which extends longitudinally of the tractor. The shaft 48 comprises telescopic sections 49 connected by a universal joint 50 and on the rear section 49 is fixed a sprocket 51, around which is trained a sprocket chain 52 which runs over a sprocket 53 fixed on the drive shaft 54 of the tractor, as shown in Fig. 3. Thus the shaft 48 is driven from the tractor. The forward end of the shaft 48 is journalled in the plate 14 and carries a sprocket 55, around which is trained a chain 56 which runs over a sprocket 57 fixed upon the shaft 40 and thereby drives the conveyor. On the forward side of the plate 14 is a pitching wheel, indicated in general at 58, this wheel being fixed on the forward end of the shaft 48. The wheel 58 consists of a disk 59 having on its front face a series of regularly disposed angle bars 60, each having one leg resting on the disk 59 and its other leg projecting forwardly from the disk. These bars are held on the disk as by rivets 61 or any other suitable means. It will now be observed that when the shaft 48 rotates, the pitching wheel 58 will also rotate. Carried by the plate portion 15 is an outwardly extending bracket 62 having adjacent its outer end a pair of alined bearings 63 wherein is journalled a shaft 64. On the rear end of the shaft 64 is a sprocket 65 which is connected by a chain 66 with a sprocket 67 fixed on the shaft 48. Carried by the plate portion 15 is a bearing boss 68 wherethrough extends a shaft 69 having a cutting or chopping wheel 70 fixed on its forward end in front of the plate 15. The cutting or chopping wheel 70 is provided with an undulated and sharpened edge 71. On the rear of the shaft 69 is fixed a bevel gear 72 which meshes with a bevel gear 73 carried by the forward end of the shaft 64. By this means, rotation of the shaft 48 drives the shaft 64 and through the medium of the bevel gears effects driving of the chopping wheel 70.

A guide or guard member 74 is provided at the inner end of the conveyor proper and has a forwardly extending blade 75. Also a deflector member 76 is pivoted on the shaft 43 and has a cover portion 77 which may be positioned at any desired angle so as to deflect material passing off the conveyor downwardly.

In the operation of the device, the tractor is driven through the yard or other place at which the manure has been collected and as the tractor moves forwardly, the chopping wheel will rotate and chop the material into portions of such size as to be readily handled by the pitching wheel. At the same time, the inclined position of the chopping wheel is such that the material chopped will pass inwardly into the path of the pitching wheel. As this chopped material is reached by the pitching wheel, it is picked up and tossed onto the lower end of the conveyor from whence it is conveyed to the upper end for delivery to a cart or other receptacle moving along with the tractor. It is of course obvious that the operating lever will be used to set the height of the device at a proper point to effect the best disposition of the material to be loaded.

There has thus been provided a simple and efficient device of the kind described and for the purpose specified.

It is obvious that changes may be made in the form and construction of the invention without departing from the material principles thereof. It is therefore not desired to confine the invention to the exact form herein shown and described, but it is desired to include all such as properly come within the scope of the appended claims.

I claim:

1. In a device of the kind described, a pitching wheel revoluble on an axis alined in the direction of movement of the device, a supporting plate for said pitching wheel extending at right angles to the axis thereof, an extension from one end of the supporting plate inclined forwardly and outwardly with respect to the plate, a chopping wheel revoluble on an axis perpendicular to the plate extension, a conveyor extending outwardly from the other end of said plate and receiving material from said pitching wheel, and means to drive said conveyor and wheels.

2. In a device of the kind described, a pitching wheel revoluble on an axis alined in the direction of movement of the device, a supporting plate for said pitching wheel extending at right angles to the axis thereof, an extension from one end of the supporting plate inclined forwardly and outwardly with respect to the plate, a chopping wheel revoluble on an axis perpendicular to the plate extension, a conveyor extending outwardly from the other end of said plate and receiving material from said pitching wheel, means to drive said conveyor and wheels, and means for supporting the device in vertical adjustable relation to a vehicle.

3. In a device of the kind described, a pitching wheel revoluble on an axis alined in the direction of movement of the device, a supporting plate for said pitching wheel extending at right angles to the axis thereof, an extension from one end of the supporting plate inclined forwardly and outwardly with respect to the plate, a chopping wheel revoluble on an axis perpendicular to the plate extension, a conveyor extending outwardly from the other end of said plate and receiving material from said pitching wheel, means to drive said conveyor and wheels, and means for supporting the device in vertical adjustable relation to a vehicle, said means comprising telescopic members each having one portion fixed to the device and its remaining portion adapted to be fixed to a tractor, and means for effecting protraction and retraction of the telescopic portions.

4. The device of claim 3 wherein the means for adjusting the telescopic supports comprises a rock shaft adapted to be supported beneath a tractor, rock arms projecting forwardly from said shaft and having link connection with the device adjacent said telescopic elements, a latch lever fixed on said rock shaft, and a quadrant associated with said latch lever.

WILLIAM J. WHITE.